United States Patent [19]
Edstrom, Sr. et al.

[11] Patent Number: 6,003,468
[45] Date of Patent: Dec. 21, 1999

[54] ANIMAL WATERING VALVE WITH DEFLECTABLE ELASTOMERIC BOOT

[75] Inventors: William E. Edstrom, Sr., Waterford; Peter S. Planton, Muskego, both of Wis.

[73] Assignee: Edstrom Industries, Inc., Waterford, Wis.

[21] Appl. No.: 09/113,713

[22] Filed: Jul. 10, 1998

[51] Int. Cl.[6] ................................................. A01K 7/00
[52] U.S. Cl. .................... 119/72.5; 119/72; 251/339; 251/335.1; 137/390
[58] Field of Search .................... 119/72.5, 72; 251/339, 251/335.1, 335.2, 335.3, 349; 137/448, 390

[56] References Cited

U.S. PATENT DOCUMENTS

| | | | |
|---|---|---|---|
| 2,710,594 | 6/1955 | Thompson | 119/72.5 |
| 2,939,424 | 6/1960 | Frederiksen | 119/72.5 |
| 2,946,555 | 7/1960 | Cantor | 251/342 |
| 3,228,377 | 1/1966 | Grassano | 119/72.5 |
| 3,256,917 | 6/1966 | Baumann et al. | 119/72.5 |
| 3,550,560 | 12/1970 | Edstrom | 119/72.5 |
| 4,006,716 | 2/1977 | Cross | 119/72.5 |
| 4,187,804 | 2/1980 | Taschitzki | 119/72.5 |
| 4,258,666 | 3/1981 | Edstrom | 119/72.5 |
| 4,370,948 | 2/1983 | Atkins | 119/72.5 |
| 4,391,225 | 7/1983 | Sparks | 119/72.5 |
| 4,403,570 | 9/1983 | Freehafer | 119/72.5 |
| 4,406,253 | 9/1983 | Atchley et al. | 119/72.5 |
| 4,640,306 | 2/1987 | Fan | 137/390 |
| 4,908,884 | 3/1990 | John et al. | 4/295 |
| 5,065,700 | 11/1991 | Cross | 119/72.5 |
| 5,074,250 | 12/1991 | Clark, IV | 119/72.5 |
| 5,329,877 | 7/1994 | Schumacher | 119/72.5 |
| 5,337,696 | 8/1994 | Edstrom et al. | 119/72.5 |
| 5,501,177 | 3/1996 | Edstrom, Sr. et al. | 119/72.5 |

FOREIGN PATENT DOCUMENTS

| | | | |
|---|---|---|---|
| 891352 | 1/1959 | United Kingdom | 251/335 B |

*Primary Examiner*—Michael J. Carone
*Assistant Examiner*—Judith A. Nelson
*Attorney, Agent, or Firm*—Nilles & Nilles, S.C.

[57] ABSTRACT

An animal watering valve, of the type actuated by radially deflecting a valve stem, has a deflectable elastomeric boot which is less susceptible to sticking or clogging than movable shields but which at the same time prevents or at least inhibits bedding material or other foreign materials from being jammed against the valve stem and locking the valve in its open position. The boot is very pliable—being relatively thin and made from an elastomeric material having a hardness of only about 5 Durometer Shore A. The boot preferably is formed from a unitary elastic cup-shaped member including a cylindrical body portion, a peripheral ring disposed at the upstream end of the body portion and attaching the boot to an interior surface of the valve housing, and a membrane covering the downstream end of the body portion. A central aperture is formed in the membrane for receiving a tail of the valve stem. A radial gap, formed between the downstream axial end of the boot and the periphery of the surrounding bore, is wider than the maximum radial distance that the membrane moves upon valve stem deflection. As a result, the boot offers very little resistance to deflection in response to insertion of an object and hence 1) cannot be easily clogged with bedding or other materials and 2) cannot be easily bitten into by an animal.

22 Claims, 4 Drawing Sheets

ANIMAL WATERING VALVE WITH DEFLECTABLE ELASTOMERIC BOOT

BACKGROUND OF THE INVENTION

1. Field of the Invention

The invention relates to animal watering valves and, more particularly, relates to animal actuated valves for use by mice, rats, and other relatively small laboratory animals or other animals.

2. Discussion of the Related Art

Animal actuated watering valves are well known. One such valve is disclosed in U.S. Pat. No. 5,065,700 which issued to Cross on Nov. 19, 1991 (the Cross patent). The valve disclosed in the Cross patent employs a housing having an inlet and an outlet connected by an elongated longitudinal bore, a valve element located adjacent the inlet, and an elongated actuating lever or valve stem which extends through the bore, which projects out of the outlet, and which, when deflected by an animal, opens the valve element to permit the passage of fluid through the valve housing. A movable shield or shutter member is provided adjacent the outlet to inhibit the animal from stuffing bedding material or other debris into the outlet and thus inhibits the valve from being unintentionally lodged in its open position.

The watering valve disclosed by the Cross patent suffers from several drawbacks and disadvantages. For instance, the shutter or shield is rigid and thus 1) must move with the stem or actuating lever to permit valve opening, and 2) is incapable of deflecting upon being contacted by an animal or a foreign object. The shield is thus subject to corrosion and jamming which may inhibit or even prevent valve opening or which may cause the valve to stick in its open position.

Some of the problems associated with the valve disclosed by the Cross patent can be alleviated by providing a deformable shield for the valve. For instance, U.S. Pat. No. 5,501,177 to Edstrom (the Edstrom patent) discloses an animal watering valve that employs a resilient elastomeric shield at the distal end of the valve which corresponds to the shield of the Cross patent but which is not subject to the corrosion and sticking problems discussed above with respect to the Cross patent. The shield takes the form of a unitary elastomeric generally cup-shaped member including a cylindrical body, a flange extending radially outwardly from an upstream end of the body, and a membrane covering a downstream end of the body. The flange is clamped between two cooperating members of a housing of the valve, and the membrane has a central aperture through which a stem of the valve passes. The periphery of the body is located relatively close to the periphery of the surrounding portion of the bore such that, when the valve stem is actuated, the outer radial edge of the membrane abuts the peripheral surface of the bore to arrest additional membrane movement. Continued valve stem deflection distorts the membrane to enlarge a gap between the valve stem and the periphery of the membrane aperture so as to permit unobstructed water flow out of the valve. The resilient distortion of the membrane also helps bias the valve stem towards its undeflected or closed position. This arrangement, though satisfactory, exhibits significant drawbacks and disadvantages.

For example, the shield may be pinched or damaged during assembly due to the fact that the upstream flange is clamped between the body and the guard during valve assembly. Moreover, the relatively close proximity of the shield to the periphery of the bore permits only limited membrane movement before the shield contacts the bore, after which the membrane can move only through membrane distortion. As a result, it has been discovered that bedding or other materials can become lodged between the valve stem and the periphery of the membrane aperture so tightly that the valve stem may be lodged in its deflected or open position. Moreover, under some circumstances, it may be possible for an animal to bite into the shield and destroy it. In addition, the biasing or return forces imposed by the deflected shield, though relatively small, are more than insignificant and may hinder valve actuation by weanling mice or other weak animals.

OBJECTS AND SUMMARY OF THE INVENTION

It is therefore a first principal object of the invention to provide an animal watering valve which cannot be easily lodged in its open position by the insertion of bedding material or other materials into the outlet of the valve.

Another object of the invention is to provide an animal watering valve that meets the fast principal object and that has a protective boot that cannot be easily accessed by an animal attempting to bite into it.

Still another object of the invention is to provide an animal watering valve that meets the first principal object and that has a protective boot which does not by itself impart significant resistance to valve actuation and which therefore can be actuated by relatively weak animals.

In accordance with a first aspect of the system, these objects are achieved by providing an animal watering valve that includes a valve element, a valve stem, and a generally cup-shaped elastomeric boot, all of which are housed in a housing. Formed in the housing are 1) an axial bore, 2) an inlet in fluid communication with the bore, and 3) an outlet in fluid communication with the bore. The valve stem is located in the bore and extends from the valve element toward the outlet. The valve stem is radially deflectable with respect to the housing between 1) a relatively central, undeflected position in which the valve element is closed and 2) a radially deflected position in which the valve element is open. The boot has 1) an upstream axial end portion which is attached to a stationary interior surface of the valve housing, and 2) a downstream axial end portion which surrounds the valve stem. The boot and the bore are dimensioned and configured relative to one another such that the boot resiliently deflects throughout at least substantially all of a full range of radial deflection of the valve stem without contacting any peripheral surface of the bore.

A radial gap is formed between the downstream axial end portion of the boot and an adjacent peripheral surface of the bore and has a thickness $\alpha$ when the valve stem assumes the undeflected position. On the other hand, the downstream axial end portion of the boot moves a maximum radial distance $\beta$ upon maximum radial deflection of the valve stem. The boot cannot contact the peripheral surface of the bore during valve stem deflection because $\beta$ is less than $\alpha$.

The boot preferably comprises 1) a cylindrical body portion having an upstream end and a downstream end, 2) a peripheral ring which is located at the upstream end of the body portion which surrounds a downstream axial end portion of the stationary interior surface so as to clamp the boot to the stationary interior surface, and 3) a membrane which forms the downstream axial end portion of the boot and which has a central aperture formed therethrough for the passage of the valve stem.

A second principal object of the invention is to provide an improved method of supplying drinking water to lab animals or the like.

In accordance with another aspect of the invention, this object is achieved by first providing a valve which has at least the general characteristics of the valve discussed above in conjunction with the first principal object. The valve is then actuated by deflecting the valve stem radially with respect to the housing from a relatively central, undeflected position to a deflected position thereby to open the valve element and to permit water to flow through the valve element and out of the outlet. During the deflecting step, a downstream end of the boot moves with the valve stem throughout at least substantially all of a full range of radial deflection of the valve stem without contacting any peripheral surface of the bore.

Preferably, the downstream axial end portion of the boot does not substantially deform during the deflecting step.

Other objects, features, and advantages of the present invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout and in which.

DETAILED DESCRIPTION OF THE PREFERRED EMBODIMENTS

1. Resume

Pursuant to the invention, an animal watering valve is provided which is actuated by radially deflecting a valve stem and which has a deflectable elastomeric boot which is less susceptible to sticking or clogging than movable shields but which at the same time prevents or at least inhibits bedding material or other foreign materials from being jammed against the valve stem and locking the valve in its open position. The boot is very pliable—being relatively thin and made from an elastomeric material having a hardness of only about 5 Durometer Shore A. The boot preferably is formed from a unitary elastic cup-shaped member including a cylindrical body portion, a peripheral ring disposed at the upstream end of the body portion and attaching the boot to an interior surface of the valve housing, and a membrane covering the downstream end of the body portion. A central aperture is formed in the membrane for receiving a tail of the valve stem. A radial gap, formed between the downstream axial end of the boot and the periphery of the surrounding bore, is wider than the maximum radial distance that the membrane moves upon valve stem deflection. As a result, the boot offers very little resistance to deflection in response to insertion of an object and hence 1) cannot be easily clogged with bedding or other materials and 2) cannot be easily bitten into by an animal.

2. System Overview and Construction of First Embodiment

Referring initially to FIGS. 1–6, an animal watering valve 20 is illustrated which is designed to supply water to relatively small animals such as mice and rats on an on-demand basis. The animal watering valve 20 includes as its principal components a housing 22, a valve element 24, a valve stem 26, and an elastomeric boot 28. The valve element 24 includes a diaphragm 30, a ring 32, and a head 34 of the valve stem 26, all clamped together within the housing 22. The major components of valve 20 will now be described.

Figure 1:
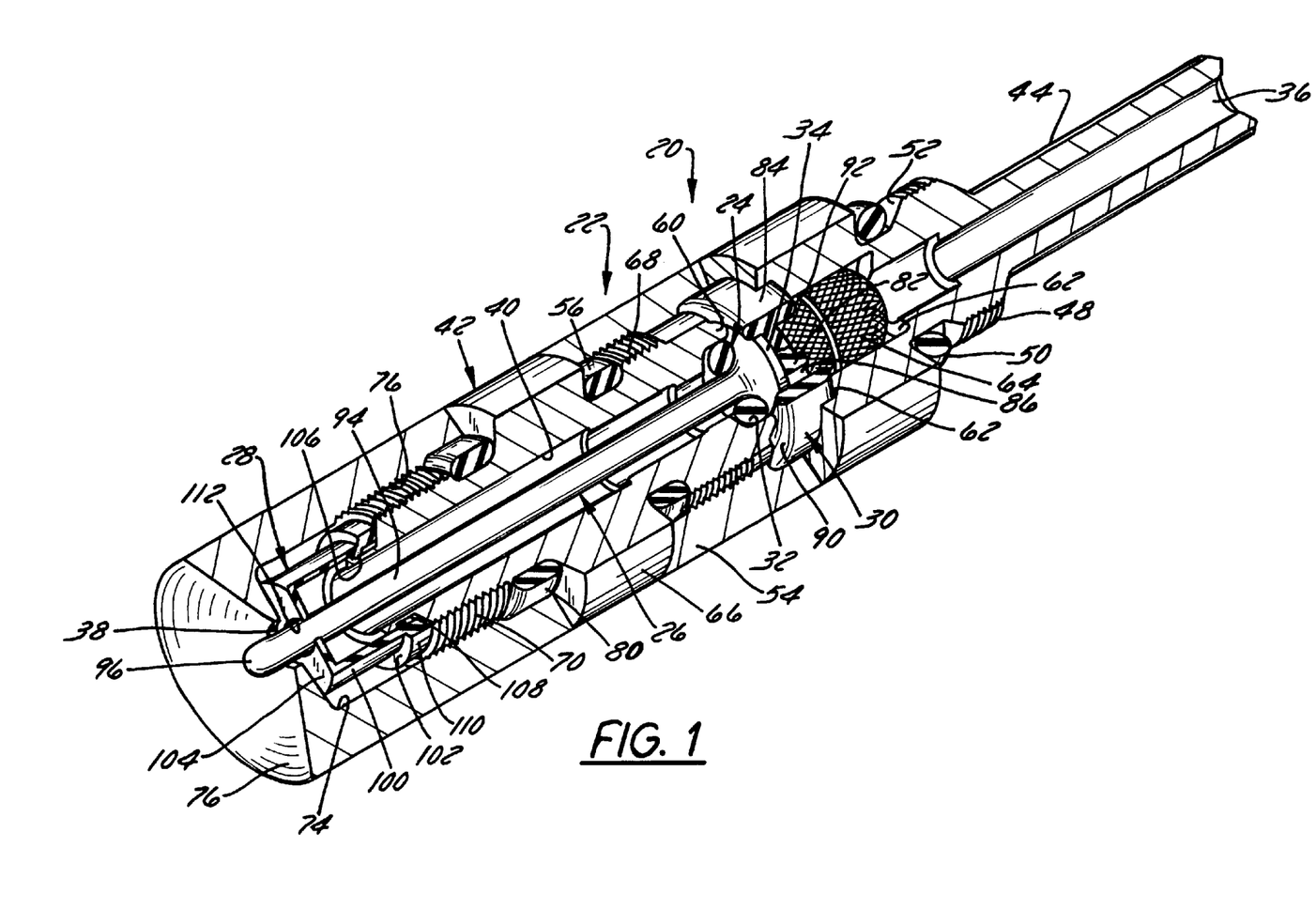
FIG. 1 is a partially cut away perspective view of an animal watering valve constructed in accordance with a first embodiment of the invention.
Figure 2:
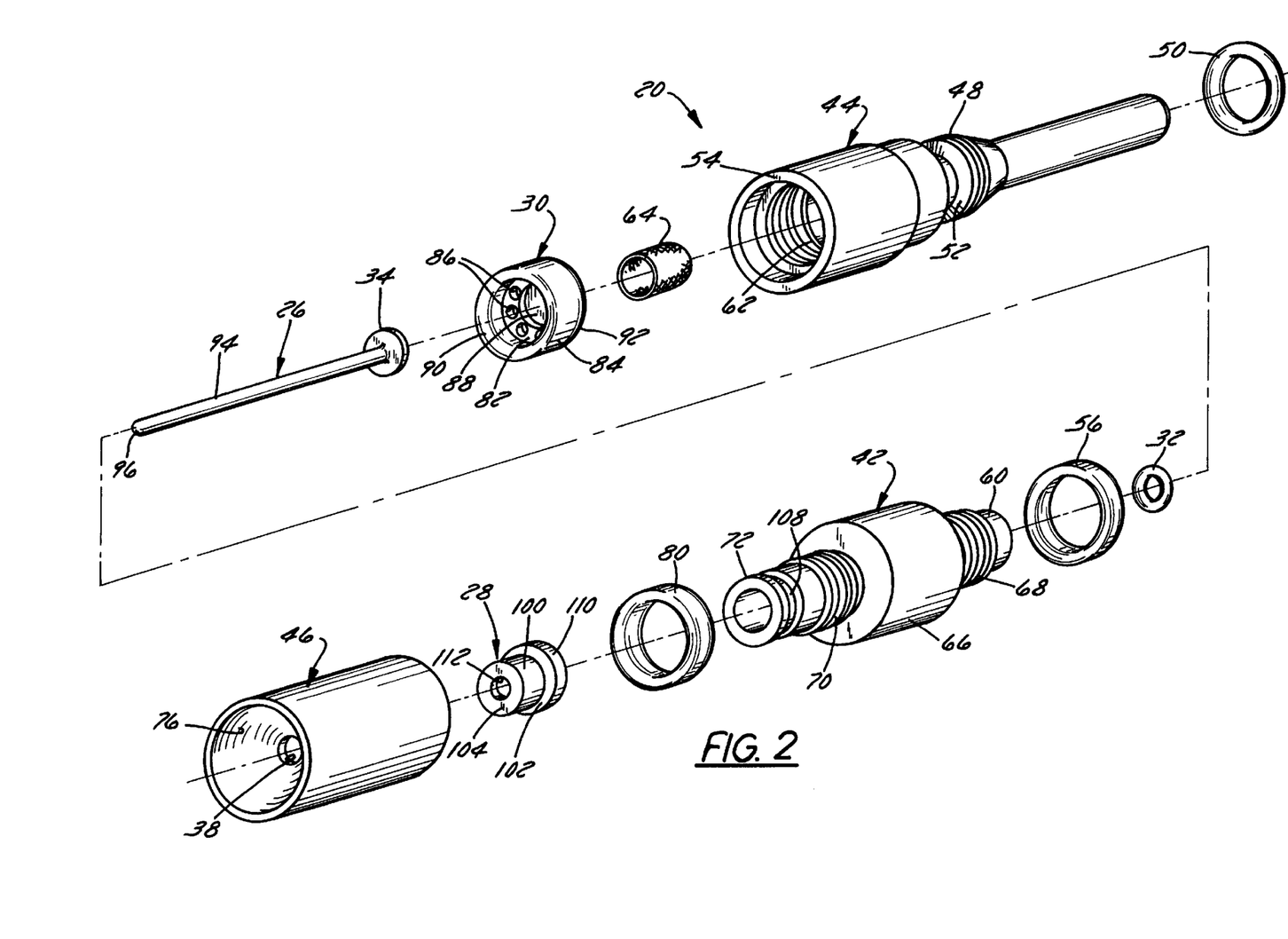
FIG. 2 is an exploded perspective view of the animal watering valve of FIG. 1.
Figure 3:
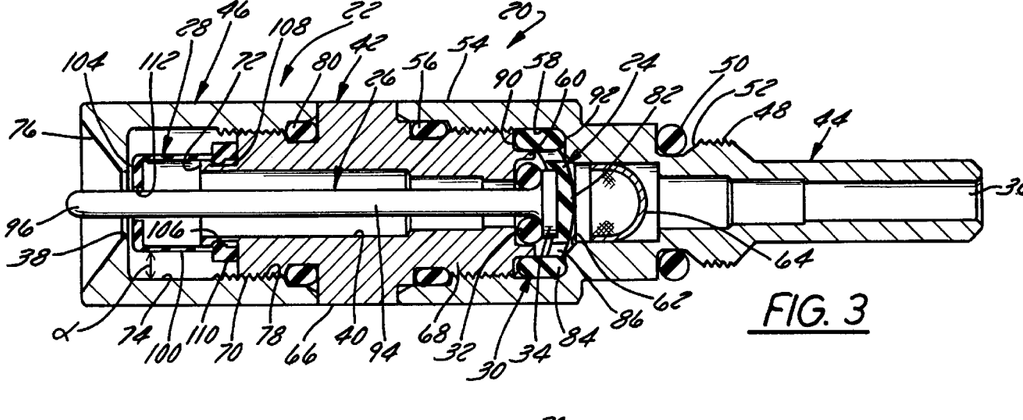
FIG. 3 is a sectional side elevation view of the animal watering valve of FIGS. 1 and 2, illustrating the valve in its de-actuated or closed position.
Figure 4:
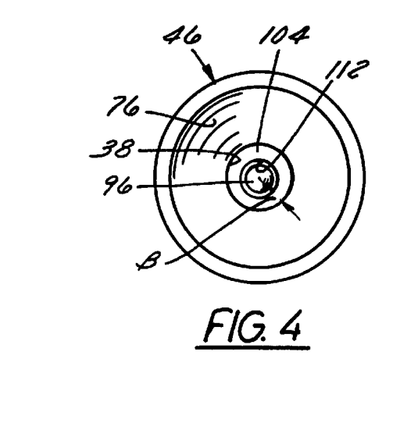
FIG. 4 is a downstream end view of the animal watering valve of FIGS. 1–3, illustrating the valve in its de-actuated or closed position.

The housing 22 may comprise any structure capable of supporting the remaining components of the valve 20 so long as it has an inlet 36, an outlet 38, and an elongated bore 40. The bore 40 receives the valve stem 26 and permits fluid flow from the inlet 36 to the outlet 38. The bore 40 preferably (but not necessarily) directly connects the outlet 38 to the inlet 36 so that water flows generally axially through the valve 20. (The terms "axial" and "radial" are used herein for the sake of convenience to designate directions of extension, flow, or movement because the illustrated housing 22 is cylindrical. However, these terms should not be construed to exclude a non-cylindrical design. Hence, for example, "axial" should be construed to be synonymous with "longitudinal.")

In order to facilitate assembly, the housing 22 is preferably formed from three axially-aligned pieces including a body 42, a cap 44 threaded onto an upstream end of the body 42, and a guard 46 threaded onto a downstream end of the body.

The cap 44 is designed to 1) receive a male fitting of a quick-connect coupling, 2) be mounted on the body 42 for longitudinal adjustment with respect thereto, and 3) clamp the diaphragm 30, the valve stem 26, and the ring 32 between the cap 44 and the body 42 without unduly distorting the diaphragm 30. To these ends, the inlet end of the cap 44 presents a threaded portion 48 for locking the valve in a cage (not shown). The inlet end also receives an O-ring 50 in a recess 52 thereof for sealingly engaging the end of the male fitting. The outlet end of the cap 44 is formed from an internally threaded shank 54 which is connected to the body 42 with an O-ring 56 disposed therebetween. A valve chamber 58 is formed in the shank 54 for housing the valve element 24. The valve chamber 58 is bounded at its downstream end by the upper end of the body 42, at its outer radial periphery by a peripheral wall which surrounds a first, upstream boss 60 of the body 42, and at its upstream end by a shoulder 62 of cap 44. A portion of the bore 40 located upstream of the chamber 58 is enlarged so as to receive a screen 64 which prevents bedding and debris from clogging the valve element 24.

The body 42 includes a central portion 66, an upstream end portion 68 threaded into the cap 44, and a downstream end portion 70 threaded into the guard 46. The upstream end portion 68 and downstream end portion 70 are both of reduced diameter with respect to the central portion 66 so as to have a width generally equal to the width of the shank 54 of the cap 44. A recess is counterbored into the axial end of the boss 60 for receiving the ring 32. The downstream end portion 70 presents a stationary interior surface in the form of a second or downstream boss 72 that receives the boot 28 as detailed below.

The guard 46 is designed to prevent an animal from perching on the tail or downstream end of the valve stem 26 and thus from unintentionally holding the valve 20 in its actuated or open position. The guard 46 is also designed to protect the boot 28. In the illustrated embodiment, the guard 46 has a counterbore 74 formed in the upstream end thereof and also has a generally frustoconical recess 76 formed in the downstream end thereof. The counterbore 74 is threaded at an upstream end portion 78 thereof to permit attachment of the guard 46 to the downstream end portion 70 of the body 42 with an O-ring 80 therebetween. The frustoconical recess 76 terminates at the valve outlet 38 and is designed to facilitate access to the valve stem 26 by an animal while inhibiting the lodging of bedding materials or other debris between the guard 46 and the valve stem 26.

The diaphragm 30 is formed from a unitary elastomeric element including a central web portion 82 and a cylindrical peripheral portion 84. The web portion 82 is perforated and thus has apertures 86 formed therethrough for the passage of water. The web portion 82 also has a recess 88 counterbored into the downstream surface thereof for receiving the valve stem head 34 as detailed below. The peripheral portion 84 has 1) a first end 90 extending axially downstream from the web portion 82 and 2) a second end 92 extending axially upstream from the web portion 82. The first end 90 is radially clamped between the first boss 60 of the body 42 and the inner periphery of the cap 44 to hold the diaphragm 30 in position. The second end 92 engages the shoulder 62 on the cap 44, thereby providing a gap between the upstream surface of the web portion 82 and the shoulder 62 and thus permitting unobstructed deflection of the web portion 82. Peripheral portion 84 thus serves as a support via which the web portion 82 can stretch without undue distortion. This absence of distortion and unobstructed deflection assure the imposition of uniform return forces on the valve stem 26.

The valve stem 26 includes the head 34 and a tail 94 which extends axially downstream from the head. The head 34, which is clamped between the ring 32 and the diaphragm 30, normally seals against the ring 32 to prevent water from flowing through the valve 20. Preferably, the head 34 is configured to seat in the recess 88 in the web portion 82 of the diaphragm 30 to enhance the ability of the diaphragm to center the valve stem 26 in the bore 40. The tail 94 provides an animal-accessible actuating element for opening the valve 20. To this end, the tail 94 extends through the bore 40, beyond the outlet 38, and terminates in a distal end 96 extending into the recess 76 of the guard 46. The distal end 96 of the tail 94 should not terminate so far within the recess 76 as to inhibit access to the valve stem 26 by the animal. In fact, it may be desirable to have the distal end 96 extend slightly beyond the downstream end of the guard 46, so long as it does not extend so far beyond the end of the guard 46 that an animal perching on top of the valve 20 can easily actuate the valve 20.

The maximum possible stroke or radial movement $\beta$ of the distal end 96 of the tail 94 is determined by the geometry of the valve 20. In some valves, the tail can deflect only until it abuts the side of the bore upstream of the valve outlet. In the illustrated embodiment, the tail distal end 96 can move radially until it abuts the periphery of the outlet 38, and $\beta$ therefore equals the thickness of the gap between the distal end 96 and the periphery of the outlet 38.

The ring 32 may comprise any structure that selectively 1) seals against the head 34 of the valve stem 26 when the valve stem 26 assumes its undeflected position, thereby preventing fluid flow through the valve 20, and 2) separates from the head 34 upon valve stem deflection, thereby permitting fluid flow through the valve 20. The ring 32 preferably is elastomeric so as to help center the valve stem 26 in the bore 40. The ring 32 could be either at least substantially O-shaped as illustrated, D-shaped, or any other suitable shape.

The purpose of the boot 28 is to prevent bedding material or other debris from being lodged between the distal end 96 of the valve stem tail 94 and the outlet 38 and, thus, to prevent the valve 20 from being lodged in its open position. The boot 28 is also designed to prevent or inhibit an animal from biting into the boot 28 and perforating and/or from pulling the boot out of the valve 20.

To these ends, the boot 28 is formed from a unitary elastomeric cup-shaped member including a cylindrical body portion 100, a peripheral ring 102 disposed at an upstream end of the body portion 100, and a membrane 104 covering a downstream end of the body portion 100. A portion 106 of the ring 102, which extends radially inwardly from the body portion 100 adjacent the upstream axial end portion of the boot 28, is seated in a mating groove 108 in the second boss 72 of the body 42 so as to clamp the boot 28 to the second boss 72. A larger portion 110 of the ring 102 extends radially outwardly from the body portion 100 to stiffen the boot 28 in the vicinity of the boss 72, thereby helping to provide a more secure connection of the boot 28 to the boss 72. The membrane 104 has a central aperture 112 formed therethrough which is larger in diameter than the diameter of the tail 94 to permit substantially unobstructed flow of fluid out of the valve 20 upon valve actuation.

The boot 28 is constructed and configured relative to the remainder of the valve 20 to resiliently deflect very easily. Hence, it is made of a relatively soft, elastic material such as silicone rubber or neoprene which has hardness of less than about 10 Durometer Shore A and preferably of about 5 Durometer Shore A or even less. (In contrast, the material used in the commercial version of the animal watering valve disclosed in the Edstrom '177 patent has a hardness of between 20 and 30 Durometer Shore A). Moreover, the membrane 104 and body portion 100 are relatively thin, with the body portion 100 having a thickness of less than 0.01" and the membrane 104 having a thickness of only about 0.025'. In addition, a gap $\alpha$ between the boot 28 and the adjacent peripheral surface of the bore 40 is substantially wider than the maximum stroke $\beta$ of the distal end 96 of the valve stem so as to permit unobstructed boot movement through the full extent of radial deflection of the valve stem tail 94. In the illustrated embodiment, $\alpha$ is about 0.085" and $\beta$ is about 0.05".

3. Operation of First Embodiment

In use, the animal watering valve 20 normally assumes the position illustrated in FIGS. 1–4 in which the tail 94 of the valve stem 26 extends coaxially through the bore 40 so that its distal end 96 extends through the center of the aperture 112 in the membrane 104 of the boot 28. The head 34 of the valve stem 26 is maintained in sealing contact with the ring 32 under the imposition of biasing forces of the diaphragm 30 and the ring 32 at this time.

Figure 5:
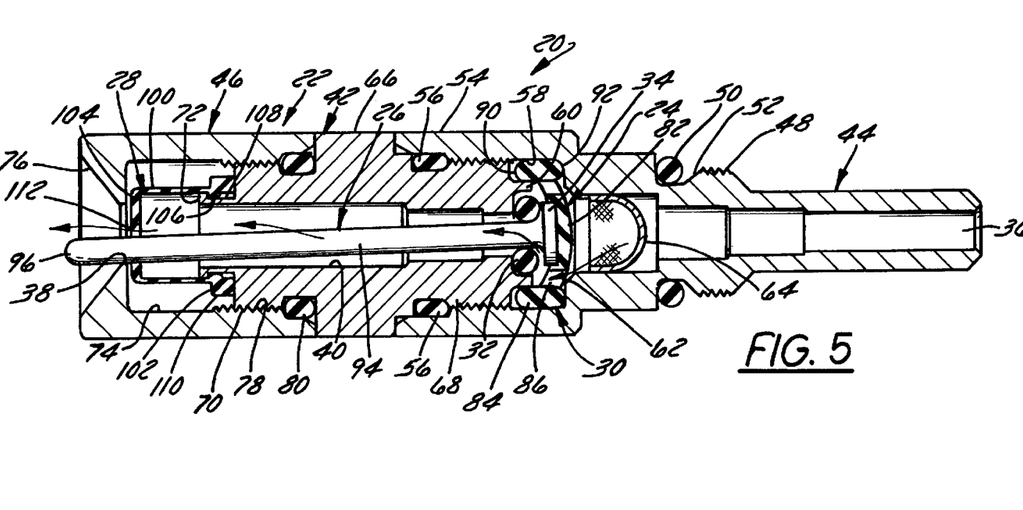
FIGS. 5 and 6 correspond to FIGS. 3 and 4, respectively, and illustrate the animal watering valve in its actuated or open position.
Figure 6:
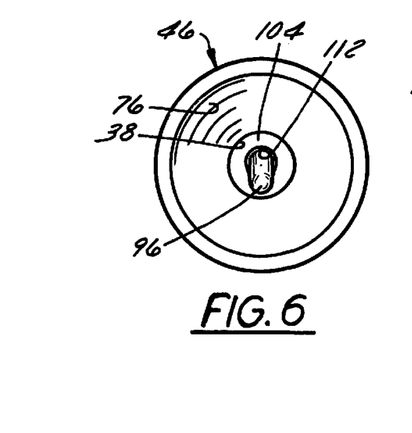

To actuate the valve 20, an animal, which may be housed in a cage of a cage and rack system (not shown), inserts its snout into or near the frustoconical recess 76 of the guard 46 and deflects the tail 94 of the valve stem 26 radially, thus pivoting the head 34 against the diaphragm 30 and forming a gap between the underside of the head 34 and the ring 32 as illustrated in FIGS. 5 and 6. Water is then free to flow through the apertures 86 in the diaphragm 30, through the gap between the head 34 and the ring 32, through the bore 40, between the valve stem tail distal end 96 and the aperture 112 in the membrane 104 of the boot 28, and out of the outlet 38 of the valve housing 22.

During at least the latter portion of valve stem movement, the membrane 104 of the boot 28 moves with the valve stem tail 94 but distorts very little, if any, due to the fact that most or even all boot deflection occurs along the body portion 100 rather than at the membrane 104. As a result, the boot 28 imparts very little resistance to valve stem deflection, thereby facilitating use of the valve 20 by weanling mice or other weak animals. Moreover, because the boot 28 is very pliable and does not engage the periphery of the surrounding portion of the bore 40, it is virtually impossible for materials to lodge in the annular space between the valve stem tail 94 and the periphery of the central aperture 112 in the membrane 104. The membrane 104 simply moves out of the way and then pops back into place once the materials fall out of the valve 20. Similarly, if an animal tries to bite at the membrane 104, the membrane 104 simply moves away from the animal's snout, thereby inhibiting access to the membrane 104 by the animal.

Upon release of the valve stem 26, the valve 20 closes automatically, primarily under the return forces imposed by the diaphragm 30. Unlike the valve disclosed in the Edstrom '177 patent, these return forces are supplemented little if any by movement of the boot 28 to its undeflected position.

4. Construction and Operation of Second Embodiment

It may in some instances be desirable to provide a flow of water out of the valve which is more directed than that which can be provided by allowing water to flow around the periphery of the valve stem. This more directed flow can be achieved by designing the valve stem such that water flows out of the valve stem tail distal end as opposed to around it. This effect can be achieved using the valve 120 of FIGS. 7–10. Apart from modifications to the valve stem 126 and to minor modifications to the membrane 204 of the boot 128 to achieve this effect, the valve 120 of this embodiment is identical to the valve 20 of the first embodiment. For the sake of clarity and conciseness, components of this embodiment that correspond to components of the first embodiment are, accordingly, designated by the same reference numerals, incremented by 100.

Figures 7, 8, 9, 10:
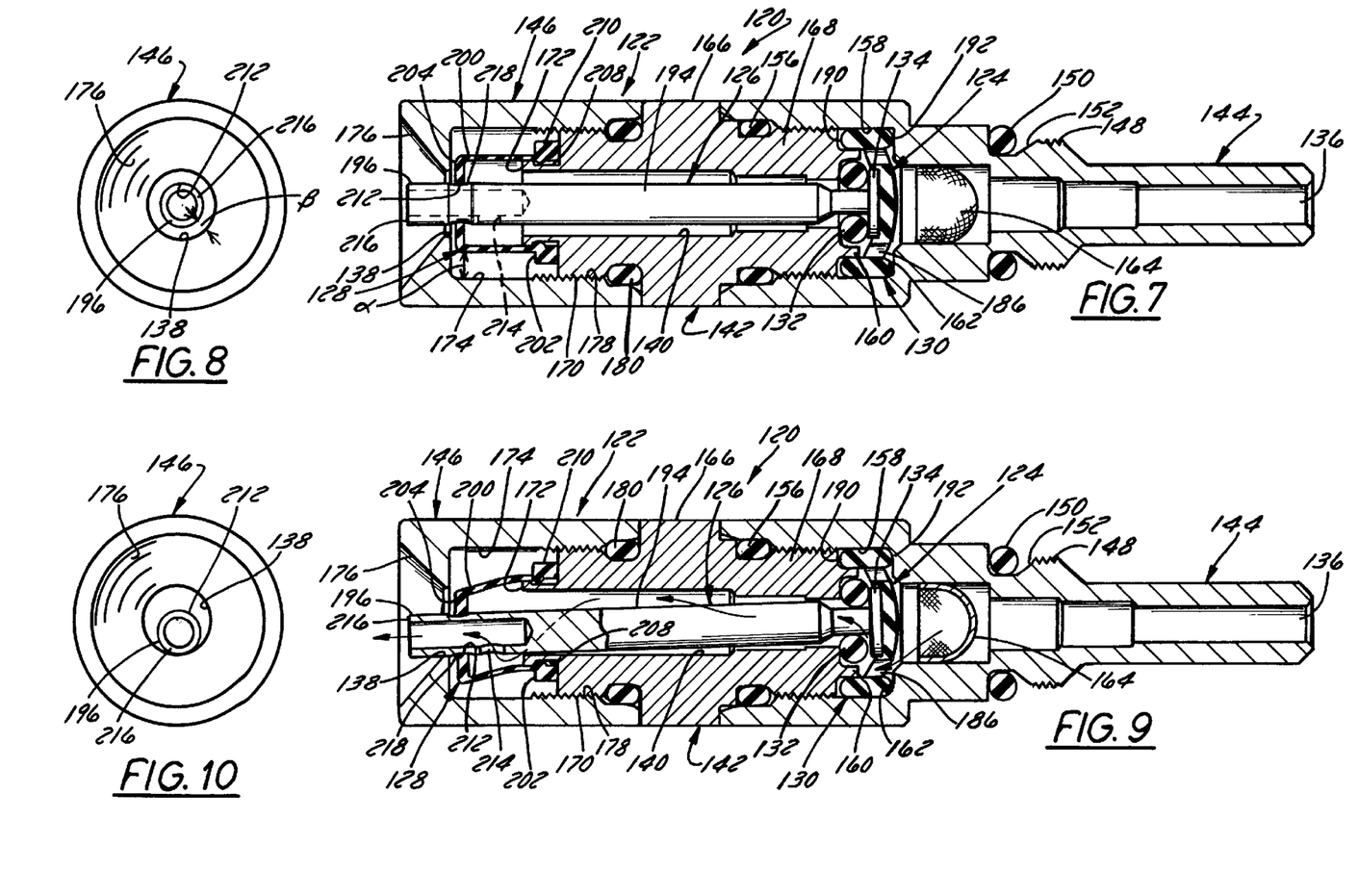
FIG. 7 is a sectional side elevation view of an animal watering valve constructed in accordance with a second embodiment of the present invention and illustrating the animal watering valve in its de-actuated or closed position.
FIG. 8 is a downstream end view of the animal watering valve of FIG. 7, illustrating the valve in its de-actuated or closed position.
FIGS. 9 and 10 correspond to FIGS. 7 and 8, respectively, and illustrate the animal watering valve in its actuated or open position.

The animal watering valve 120 of this embodiment includes as its principal components a housing 122, a valve element 124, a valve stem 126, and an elastomeric boot 128. The housing 122 includes an axially central body 142 flanked at its opposite ends by a cap 144 and a guard 146. The valve element 124 comprises a diaphragm 130, a ring 132, and a head 134 of the valve stem 126. The valve stem 126 additionally includes a tail 194 that extends through an axial bore 140 in the housing 122 and that terminates in a distal end 196 that is accessible by an animal. The boot 128, like the boot 28 of the first embodiment, is formed from a unitary elastomeric cup-shaped member that includes a cylindrical body portion 200, a peripheral ring 202, and a membrane 204. The ring 202 is disposed at an upstream end of the body portion 200 and connects the boot 128 to a boss 172 on a downstream end portion 170 of the body 142. The membrane 204 covers a downstream end of the body portion 200 and has a central aperture 212 formed therethrough for the passage of the distal end 196 of the valve stem tail 194.

The distal end 196 of the valve stem tail 194 is tubular rather than solid as in the previous embodiment. Radial inlet apertures 214 are formed in the distal end 196 at a location upstream of the membrane 204 of the boot 128, and an axial outlet 216 is formed from a downstream opening in the distal end 196. The outer periphery of the distal end 196 is sealed via an interference fit or the like to an inner lip of the membrane 204 that borders the aperture 212. If desired, this seal can be improved by forming a groove 218 in the outer peripheral surface of the distal end 196 for mating with the lip of the membrane 204.

The valve 120 operates identically to the manner in which the valve 20 of the first embodiment operates except for the manner in which water flows out of the valve. Specifically, when an animal deflects the valve stem 126 to unseat the valve head 134 from the ring 132, water flows through the inlet 136 of the valve housing 122 and into the bore 140 as in the first embodiment. However, unlike in the first embodiment, the boot 128 remains sealed against the distal end 196 of the valve stem tail 194 as illustrated in FIGS. 9 and 10. Water therefore can flow out of the valve 120 only through the inlet apertures 214 in the distal end 196, through the hollow interior of the distal end, and out of the outlet 216 in the distal end. The desired directed flow therefore is achieved.

Other changes and modifications which could be made to the present invention without departing from the spirit and scope thereof will become more readily apparent from a reading of the appended claims.

What is claimed is:

1. An animal watering valve comprising:
    (A) a housing which has formed therein 1) an axial bore, 2) an inlet in fluid communication with said bore, and 3) an outlet in fluid communication with said bore;
    (B) a valve element which is located in said bore;
    (C) a valve stem which is located in said bore and which extends from said valve element toward said outlet, said valve stem being radially deflectable with respect to said housing between 1) a relatively central, undeflected position in which said valve element is closed and 2) a radially deflected position in which said valve element is open; and
    (D) a generally cup-shaped elastomeric boot which is located in said housing and which has
        (1) an upstream axial end portion which is attached to a stationary interior surface of said housing, and
        (2) a downstream axial end portion which surrounds said valve stem, wherein
            said boot and said bore are dimensioned and configured relative to one another such that said boot resiliently deflects throughout at least substantially all of a full range of radial deflection of said valve stem without contacting any peripheral surface of said bore.

2. An animal watering valve as defined in claim 1, wherein
    a radial gap is formed between said downstream axial end portion of said boot and an adjacent peripheral surface of said bore, said radial gap having a thickness α when said valve stem assumes said undeflected position,
    said downstream axial end portion of said boot moves a maximum radial distance β upon maximum radial deflection of said valve stem, and wherein β is less than α.

3. An animal watering valve as defined in claim 1, wherein said boot comprises
   (1) a cylindrical body portion having an upstream end and a downstream end,
   (2) a peripheral ring which is located at said upstream end of said body portion and which surrounds a downstream axial end portion of said stationary interior surface so as to clamp said boot to said stationary interior surface, and
   (3) a membrane which forms said downstream axial end portion of said boot and which has a central aperture formed therethrough for the passage of said valve stem.

4. An animal watering valve as defined in claim 3, wherein said peripheral ring is formed integrally with said body portion.

5. An animal watering valve as defined in claim 3, wherein at least a portion of said peripheral ring extends radially inwardly of said body portion and is seated in a mating peripheral groove formed in said stationary interior surface.

6. An animal watering valve as defined in claim 5, wherein said housing includes a body, a cap which is attached to said body and at least a portion of which is located upstream of said body, and a guard which is attached to said body and at least a portion of which is located downstream of said body, said valve element being located at a junction between said cap and said body, said stationary interior surface of said housing comprising a downstream end portion of said body, said valve stem extending through said body and terminating in a distal end positioned near a downstream axial end of said guard.

7. An animal watering valve as defined in claim 3, wherein, during deflection of said valve stem, deformation of said boot occurs at least primarily along said body portion rather than at said membrane.

8. An animal watering valve as defined in claim 1, wherein said boot is formed from an elastomeric material having a hardness of less than about 10 Durometer Shore A.

9. An animal watering valve as defined in claim 8, wherein said elastomeric material has a hardness of no more than about 5 Durometer Shore A.

10. An animal watering valve as defined in claim 1, wherein said valve element includes
    a valve seat,
    a valve member formed from a head of said valve stem, and
    a resilient diaphragm which normally biases said valve member into sealing engagement with said valve seat and which deflects when said valve stem is deflected to permit unseating of said valve member from said valve seat and flow of water through said valve.

11. An animal watering valve as defined in claim 1, wherein said valve stem is tubular and has an internal passage formed therein for the flow of water therethrough.

12. An animal watering valve as defined in claim 11, wherein said passage terminates in an open distal end of said valve stem, and wherein said downstream axial end portion of said boot is seated on said valve stem.

13. An animal watering valve as defined in claim 10, wherein said housing includes a body, a cap at least a portion of which is located upstream of said body, and a guard which is attached to said body and at least a portion of which is located downstream of said body, said diaphragm being located at a junction between said cap and said body and said boot being located at least partially within said guard, said valve stem extending through said body and terminating in a distal end positioned near a downstream axial end of said guard.

14. An animal watering valve comprising:
    (A) a housing which has formed therein 1) an axial bore, 2) an inlet in fluid communication with said bore, and 3) an outlet in fluid communication with said bore;
    (B) a valve element which is located in said bore;
    (C) a valve stem which is located in said bore and which extends from said valve element, through said upstream portion of said bore, through a reduced diameter portion of said bore, and toward said outlet, said valve stem being radially deflectable with respect to said housing between 1) a relatively central, undeflected position in which said valve element is closed and 2) a radially deflected position in which said valve element is open; and
    (D) a generally cup-shaped elastomeric boot which is located in said housing and which includes
       (1) a cylindrical body portion which has an upstream end and a downstream end,
       (2) a peripheral ring at least a portion of which extends radially inwardly from said upstream end of said body portion and which surrounds a downstream axial end portion of a stationary interior surface of said housing so as to clamp said boot to said stationary interior surface, and
       (3) a membrane which covers said downstream end of said body portion and which has a central aperture formed therethrough for the passage of said valve stem, wherein
          a radial gap is formed between said membrane and an adjacent peripheral surface of said bore, said radial gap having a thickness α when said valve stem assumes said undeflected position,
          said membrane moves a maximum radial distance β upon maximum radial deflection of said valve stem, and wherein
          β is less than α.

15. An animal watering valve comprising:
    (A) a cylindrical housing which has an inlet, an outlet, and a bore extending axially from said inlet to said outlet, said housing including
       (1) a body which has a boss at a downstream end thereof, a groove being formed in an outer peripheral surface of said boss,
       (2) a cap which is attached to said body and at least a portion of which is located upstream of said body, and
       (3) a guard which is attached to said body and at least a portion of which is located downstream of said body;
    (B) valve element including a diaphragm which is located at a junction between said cap and said body;
    (C) a valve stem which extends from said diaphragm, through said bore, and through said outlet, said valve stem being radially deflectable with respect to said housing between 1) a relatively central, undeflected position in which said valve element is closed and 2) a radially deflected position in which said valve element is open; and
    (D) a generally cup-shaped elastomeric boot which is located in said housing, which is formed of material having a hardness of less than 10 Durometer Shore A, and which includes
       (1) a cylindrical body portion which has an upstream end and a downstream end, (2) a peripheral ring at least a portion of which extends radially inwardly from said upstream end of said body portion and which is seated in said groove in said boss so as to clamp said boot to said boss, and (3) a membrane which covers said downstream end of said body portion and which has a central aperture formed therethrough for the passage of said valve stem, wherein a radial gap is formed between said membrane and an adjacent peripheral surface of said bore, said radial gap having a thickness $\alpha$ when said valve stem assumes said undeflected position, said membrane moves a maximum radial distance $\beta$ upon maximum radial deflection of said valve stem, and wherein $\beta$ is less than $\alpha$.

16. A method of actuating an animal watering valve comprising:

(A) providing a valve including
   (1) a housing which has formed therein a) an axial bore, b) an inlet in fluid communication with said bore, and c) an outlet in fluid communication with said bore,
   (2) a valve element which is located in said bore,
   (3) a valve stem which is located in said bore and which extends from said valve element toward said outlet, and
   (4) a generally cup-shaped elastomeric boot which is located in said housing; and (B) deflecting said valve stem radially with respect to said housing from a relatively central, undeflected position to a deflected position thereby to open said valve element and to permit water to flow through said valve element and out of said outlet, wherein during said deflecting step, a downstream end of said boot moves with said valve stem throughout at least substantially all of a full range of radial deflection of said valve stem without contacting any peripheral surface of said bore.

17. A method as defined in claim 16, wherein a downstream axial end portion of said boot does not substantially deform during said deflecting step.

18. A method as defined in claim 17, wherein said boot comprises a cylindrical body portion having 1) an upstream axial end attached to an interior surface of said housing and 2) a downstream axial end having an aperture formed therein for the passage of said valve stem, and wherein, during said deflecting step, said boot deforms at least primarily exclusively along said body portion and imposes minimal resistance to valve stem deflection.

19. A method as defined in claim 16, wherein, if a foreign object is forced into contact with said boot, said boot deforms resiliently so as to prevent the object from being lodged between said valve stem and said boot.

20. A method as defined in claim 16, wherein, if an animal attempts to bite into said boot, said boot resiliently deforms so as to deny access to said boot by the animal.

21. A method as defined in claim 16, wherein, during the deflecting step, water flows around a distal end of said valve stem and through a gap formed between said valve stem and said downstream end of said boot.

22. A method as defined in claim 16, wherein, during the deflecting step, water flows through a distal end of said valve stem.

* * * * *